United States Patent
Burcham et al.

(10) Patent No.: US 11,549,839 B2
(45) Date of Patent: Jan. 10, 2023

(54) SYSTEMS AND METHODS FOR DETERMINING FLOATING ROOF LEVEL TILT AND CHARACTERIZING RUNOFF

(71) Applicant: PERCEPTIVE SENSOR TECHNOLOGIES, INC., Tucson, AZ (US)

(72) Inventors: Joel D. Burcham, Huntsville, AL (US);
Earl Crochet, Humble, TX (US);
Lazar Bivolarsky, Cupertino, CA (US);
James M. Heim, Tucson, AZ (US);
William Coleman, Tucson, AZ (US)

(73) Assignee: PERCEPTIVE SENSOR TECHNOLOGIES, INC., Tucson, AZ (US)

( * ) Notice: Subject to any disclaimer, the term of this patent is extended or adjusted under 35 U.S.C. 154(b) by 0 days.

(21) Appl. No.: 17/542,461

(22) Filed: Dec. 5, 2021

(65) Prior Publication Data
US 2022/0178732 A1    Jun. 9, 2022

Related U.S. Application Data

(60) Provisional application No. 63/121,558, filed on Dec. 4, 2020.

(51) Int. Cl.
*G01C 9/00*    (2006.01)
*G01F 23/70*    (2006.01)

(52) U.S. Cl.
CPC .................................. *G01F 23/70* (2013.01)

(58) Field of Classification Search
CPC .... G01F 23/70; F17C 2250/0413; G01C 9/00
USPC ......... 73/319, 570, 584, 596, 627, 628, 291, 73/292, 305–308, 313, 290 V, 865.8, 73/865.9, 432.1; 33/1 R, 1 N, 1 BB; 220/216–227, 565, 567, 582
See application file for complete search history.

(56) References Cited

U.S. PATENT DOCUMENTS

| 2,449,054 A | 9/1948 | Chantlin ...................... 177/311 |
| 3,019,650 A | 2/1962 | Worswick ...................... 73/290 |

(Continued)

FOREIGN PATENT DOCUMENTS

| CN | 105548370 | 5/2016 | ............. G01N 29/24 |
| DE | 10 2010 029 254 | 12/2011 | ............... F01N 3/10 |

(Continued)

OTHER PUBLICATIONS

Amjad, Umar et al, "Advanced signal processing technique for damage detection in steel tubes" Proceedings of SPIE, Health Monitoring of Structural and Biological Systems 2016, 980511 (Apr. 1, 2016);14 pgs.

(Continued)

*Primary Examiner* — Robert R Raevis
(74) *Attorney, Agent, or Firm* — Hayes Soloway P.C.

(57) ABSTRACT

Floating roof storage tank systems and related methods are disclosed. The disclosed systems include a storage tank, a floating roof, and a plurality of acoustic sensors. The storage tank has one or more walls defining an interior space and the floating roof is configured to move vertically within the interior space. The acoustic sensors are levelly mounted along a horizontal plane on the one or more walls of the storage tank. One or more signals received by at least a portion of the plurality of acoustic sensors are used to determine a tilt angle of the floating roof.

16 Claims, 5 Drawing Sheets

(56) References Cited

U.S. PATENT DOCUMENTS

| | | | |
|---|---|---|---|
| 3,703,829 A | 11/1972 | Dougherty | 73/290 |
| 3,837,218 A | 9/1974 | Flambard et al. | G01N 29/00 |
| 3,971,962 A | 7/1976 | Green | H01L 41/08 |
| 4,065,958 A | 1/1978 | Krylova et al. | G01N 29/02 |
| 4,118,983 A | 10/1978 | Braznikov | G01F 23/28 |
| 4,121,468 A | 10/1978 | Glover et al. | G01N 29/04 |
| 4,182,177 A | 1/1980 | Prough | 73/290 |
| 4,280,126 A | 7/1981 | White | 340/621 |
| 4,320,659 A | 3/1982 | Lynnworth et al. | G01N 29/02 |
| 4,501,146 A | 2/1985 | Greenhalgh | G01F 23/28 |
| 4,580,448 A | 4/1986 | Skrgatic | G01F 23/28 |
| 4,596,266 A * | 6/1986 | Kinghorn | B65D 88/38 137/392 |
| 4,676,098 A | 6/1987 | Erlenkämper et al. | 73/290 |
| 4,852,416 A | 8/1989 | Boone et al. | H04R 1/02 |
| 4,934,191 A | 6/1990 | Kroening et al. | 73/592 |
| 4,954,997 A | 9/1990 | Dieulesaint et al. | G08B 21/00 |
| 4,977,780 A | 12/1990 | Machida et al. | G01N 29/04 |
| 5,015,995 A | 5/1991 | Holroyd | 340/621 |
| 5,038,611 A | 8/1991 | Weldon et al. | 73/290 |
| 5,148,700 A | 9/1992 | King | G01N 15/00 |
| 5,195,058 A | 3/1993 | Simon | G01S 15/02 |
| 5,295,120 A | 3/1994 | McShane | 367/188 |
| 5,325,727 A | 7/1994 | Miller et al. | G01F 1/34 |
| 5,415,033 A | 5/1995 | Maresca, Jr. et al. | 73/40.5 |
| 5,438,868 A | 8/1995 | Holden et al. | 73/290 |
| 5,460,046 A | 10/1995 | Maltby et al. | G01N 29/24 |
| 5,469,749 A | 11/1995 | Shimada et al. | G01F 1/38 |
| 5,604,314 A | 2/1997 | Grahn | G01L 5/16 |
| 5,770,806 A | 6/1998 | Hiismaki | G01F 1/662 |
| 5,821,427 A | 10/1998 | Byrd | G01F 1/66 |
| 6,035,903 A | 3/2000 | Few et al. | B65D 1/04 |
| 6,151,956 A | 11/2000 | Takahashi et al. | G01N 3/56 |
| 6,157,894 A | 12/2000 | Hess et al. | 702/54 |
| 6,192,751 B1 | 2/2001 | Stein et al. | G08B 21/00 |
| 6,330,831 B1 | 12/2001 | Lynnworth et al. | 73/861.28 |
| 6,368,281 B1 | 4/2002 | Solomon et al. | A61B 8/14 |
| 6,443,006 B1 | 9/2002 | Degrave | G02F 23/00 |
| 6,470,744 B1 | 10/2002 | Usui et al. | 73/290 |
| 6,481,287 B1 | 11/2002 | Ashworth et al. | G01K 11/24 |
| 6,513,385 B1 | 2/2003 | Han | G01N 29/00 |
| 6,575,043 B1 | 6/2003 | Huang et al. | G01F 1/66 |
| 6,578,424 B1 | 6/2003 | Ziola et al. | G01N 29/00 |
| 6,631,639 B1 | 10/2003 | Dam et al. | 73/290 |
| 6,672,163 B2 | 1/2004 | Han et al. | G01V 1/28 |
| 6,925,868 B2 | 8/2005 | Young et al. | 73/290 |
| 6,938,488 B2 | 9/2005 | Diaz et al. | 73/597 |
| 7,085,391 B1 | 8/2006 | Yamaya | G10H 1/00 |
| 7,114,375 B2 | 10/2006 | Panetta et al. | 73/61.75 |
| 7,246,522 B1 | 7/2007 | Diaz et al. | 73/597 |
| 7,299,136 B2 | 11/2007 | DiFoggio et al. | 702/22 |
| 7,330,797 B2 | 2/2008 | Bailey et al. | G01F 23/00 |
| 7,363,174 B2 | 4/2008 | Kishiro et al. | G01F 25/10 |
| 7,624,650 B2 | 12/2009 | Gysling et al. | G01F 1/66 |
| 7,624,651 B2 | 12/2009 | Fernald et al. | G01F 1/66 |
| 7,656,747 B2 | 2/2010 | Mandal et al. | G01V 1/44 |
| 7,694,570 B1 | 4/2010 | Dam et al. | 73/644 |
| 7,962,293 B2 | 6/2011 | Gysling | G01F 1/76 |
| 7,966,882 B2 | 6/2011 | Greenwood | 73/597 |
| 8,249,829 B2 | 8/2012 | Vass et al. | G06F 19/00 |
| 8,683,882 B2 | 4/2014 | Jackson | G01N 9/24 |
| 8,820,182 B2 * | 9/2014 | Nikolay Nikolov | H04Q 9/00 73/865.8 |
| 8,850,882 B2 | 10/2014 | Qu et al. | G01F 23/296 |
| 8,915,145 B1 | 12/2014 | Van Orsdol | G01F 1/74 |
| 9,057,677 B2 | 6/2015 | Field | G01N 29/032 |
| 9,557,208 B2 | 1/2017 | Kuroda et al. | G01F 23/28 |
| 9,891,085 B2 | 2/2018 | Muhammad et al. | G01F 1/88 |
| 10,122,051 B2 | 11/2018 | Kuhne et al. | H01M 10/484 |
| 10,458,871 B2 | 10/2019 | Norli | G01L 11/04 |
| 10,794,871 B1 | 10/2020 | Blackshire et al. | G01N 29/265 |
| 11,020,793 B2 | 6/2021 | De Monte et al. | B22D 2/006 |
| 2002/0170753 A1 | 11/2002 | Clare | G01G 19/22 |
| 2004/0079150 A1 | 4/2004 | Breed et al. | 73/291 |
| 2004/0173021 A1 | 9/2004 | Lizon et al. | 73/290 |
| 2004/0226615 A1 | 11/2004 | Morikawa et al. | G05D 7/06 |
| 2005/0055136 A1 | 3/2005 | Hofmann et al. | 700/273 |
| 2005/0128873 A1 | 6/2005 | LaBry | G01V 1/40 |
| 2005/0178198 A1 | 8/2005 | Freger et al. | 73/290 |
| 2005/0247070 A1 | 11/2005 | Arshansky et al. | 62/77 |
| 2006/0196224 A1 | 9/2006 | Esslinger | 62/509 |
| 2007/0068253 A1 | 3/2007 | Carodiskey | A61B 6/00 |
| 2007/0157737 A1 | 7/2007 | Gysling et al. | G01F 1/667 |
| 2007/0205907 A1 * | 9/2007 | Schenk | G01F 23/0015 340/623 |
| 2008/0092623 A1 | 4/2008 | Lynch et al. | G01N 29/02 |
| 2008/0101158 A1 | 5/2008 | Hosseini et al. | G01S 15/00 |
| 2009/0143681 A1 | 6/2009 | Jurvelin et al. | A61B 8/00 |
| 2010/0111133 A1 | 5/2010 | Yuhas et al. | G01K 17/00 |
| 2010/0199779 A1 | 8/2010 | Liu et al. | G01F 1/663 |
| 2010/0242593 A1 | 9/2010 | Lagergren et al. | G01F 23/296 |
| 2011/0029262 A1 | 2/2011 | Barkhouse | 702/55 |
| 2011/0072904 A1 | 3/2011 | Lam et al. | G01N 29/04 |
| 2011/0120218 A1 | 5/2011 | Aldridge | 73/290 |
| 2011/0239769 A1 | 10/2011 | Schmitt et al. | G01N 29/02 |
| 2011/0271769 A1 | 11/2011 | Kippersund et al. | G01F 1/66 |
| 2011/0284288 A1 | 11/2011 | Sawyer et al. | E21B 49/005 |
| 2012/0024067 A1 | 2/2012 | Oberdoerfer et al. | G01N 29/00 |
| 2012/0055239 A1 | 3/2012 | Sinha | G01N 29/00 |
| 2012/0259560 A1 | 10/2012 | Woltring et al. | 702/55 |
| 2012/0262472 A1 | 10/2012 | Garr et al. | G06T 11/206 |
| 2012/0281096 A1 | 11/2012 | Gellaboina et al. | G01S 15/89 |
| 2013/0002443 A1 | 1/2013 | Breed et al. | G08B 21/00 |
| 2013/0068027 A1 | 3/2013 | Sullivan et al. | G01N 29/04 |
| 2013/0080081 A1 | 3/2013 | Dugger et al. | G01F 1/663 |
| 2013/0090575 A1 | 4/2013 | Rupp et al. | A61N 7/00 |
| 2013/0120155 A1 | 5/2013 | Hagg | G08C 19/16 |
| 2013/0128035 A1 | 5/2013 | Johns et al. | 348/135 |
| 2013/0213714 A1 | 8/2013 | Fuida | E21B 49/00 |
| 2014/0020478 A1 | 1/2014 | Ao et al. | G01F 1/66 |
| 2014/0027455 A1 | 1/2014 | Castellano et al. | B65D 88/34 |
| 2014/0076415 A1 | 3/2014 | Dunki-Jacobs et al. | E03C 1/02 |
| 2014/0107435 A1 | 4/2014 | Sharf et al. | A61B 8/00 |
| 2014/0223992 A1 | 8/2014 | Harper et al. | G01F 25/0084 |
| 2014/0301902 A1 | 10/2014 | Fernald et al. | B01J 19/10 |
| 2014/0375169 A1 | 12/2014 | Na et al. | H01L 41/08 |
| 2015/0075278 A1 | 3/2015 | Dockendorff et al. | G01F 23/296 |
| 2015/0212045 A1 | 7/2015 | Raykhman et al. | G01F 1/74 |
| 2015/0247751 A1 | 9/2015 | Kutlik et al. | G01F 23/2962 |
| 2015/0260003 A1 | 9/2015 | McHugh et al. | E21B 33/076 |
| 2015/0276463 A1 | 10/2015 | Milne et al. | G01F 23/296 |
| 2015/0369647 A1 | 12/2015 | Kumar et al. | G01F 23/284 |
| 2016/0025545 A1 | 1/2016 | Saltzgiver et al. | G01F 23/263 |
| 2016/0041024 A1 | 2/2016 | Reimer et al. | G01F 23/296 |
| 2016/0108730 A1 | 4/2016 | Fanini et al. | E21B 49/08 |
| 2016/0146653 A1 | 5/2016 | Skelding | E21B 21/01 |
| 2016/0169839 A1 | 6/2016 | Gottlieb et al. | G01N 29/22 |
| 2016/0216141 A1 | 7/2016 | Leaders et al. | G01F 1/66 |
| 2016/0320226 A1 | 11/2016 | Schaefer et al. | G01F 23/296 |
| 2017/0002954 A1 | 1/2017 | Brown et al. | F16K 37/0058 |
| 2017/0010144 A1 | 1/2017 | Lenner et al. | G01F 23/296 |
| 2017/0010145 A1 | 1/2017 | Lenner et al. | G01F 23/2962 |
| 2017/0010146 A1 | 1/2017 | Kassubek et al. | G01F 23/296 |
| 2017/0059389 A1 | 3/2017 | Moore et al. | G01F 23/2968 |
| 2017/0082650 A1 | 3/2017 | Hies et al. | G01F 25/0007 |
| 2017/0087526 A1 | 3/2017 | Luharuka | B01F 15/00 |
| 2017/0102095 A1 | 4/2017 | Kunita et al. | F16K 37/0091 |
| 2017/0097322 A1 | 6/2017 | Giese et al. | G01N 29/07 |
| 2017/0199295 A1 | 7/2017 | Mandal | G01V 1/50 |
| 2017/0202595 A1 | 7/2017 | Shelton, IV | A61B 18/00 |
| 2017/0239741 A1 | 8/2017 | Furuta | B23H 1/10 |
| 2017/0268915 A1 | 9/2017 | Gestner et al. | G01F 1/66 |
| 2017/0309989 A1 | 10/2017 | Waelde et al. | H01Q 1/225 |
| 2018/0035603 A1 | 2/2018 | Kremmer et al. | A01C 7/20 |
| 2018/0044159 A1 | 2/2018 | Crouse et al. | B67D 1/0406 |
| 2018/0080809 A1 | 3/2018 | Tokarev et al. | G01F 23/2965 |
| 2018/0149505 A1 | 5/2018 | Ploss et al. | G01F 1/66 |
| 2018/0266874 A1 * | 9/2018 | Montoya | G01F 23/68 |
| 2018/0299317 A1 | 10/2018 | Truong et al. | G01F 23/2925 |
| 2018/0306628 A1 | 10/2018 | Parrott et al. | G01F 17/00 |
| 2018/0348169 A1 | 12/2018 | Lee et al. | G01N 29/11 |
| 2019/0011304 A1 | 1/2019 | Cunningham et al. | G01F 17/00 |

(56) References Cited

U.S. PATENT DOCUMENTS

| | | | |
|---|---|---|---|
| 2019/0063984 A1 | 2/2019 | Bowley | G01F 23/2962 |
| 2019/0078927 A1 | 3/2019 | Takayama et al. | G01F 23/2965 |
| 2019/0137310 A1 | 5/2019 | Xiao et al. | G01F 1/06 |
| 2019/0195629 A1* | 6/2019 | Vaissiere | G01F 23/64 |
| 2019/0195830 A1 | 6/2019 | Tamura et al. | G01N 29/07 |
| 2019/0272496 A1 | 9/2019 | Moeller | G06Q 10/087 |
| 2020/0018628 A1 | 1/2020 | Head et al. | G21C 17/022 |
| 2020/0182736 A1 | 6/2020 | Kim et al. | G01M 3/2807 |
| 2020/0378283 A1 | 12/2020 | Zhang et al. | F01M 11/10 |
| 2020/0378812 A1 | 12/2020 | Heim | G01F 1/667 |
| 2020/0378818 A1 | 12/2020 | Heim et al. | G01F 23/296 |
| 2021/0382014 A1 | 12/2021 | Xu et al. | G01N 29/24 |
| 2022/0178879 A1 | 6/2022 | Bivolarsky et al. | G02N 29/028 |
| 2022/0178881 A1 | 6/2022 | Bivolarsky et al. | G01N 29/04 |

FOREIGN PATENT DOCUMENTS

| | | | |
|---|---|---|---|
| DE | 102010029254 | * 12/2011 | |
| EP | 2450701 | 5/2012 | G01N 29/22 |
| EP | 2962096 | 8/2019 | G01L 1/255 |
| GB | 2192717 | 1/1990 | G01N 29/00 |
| KR | 200174618 | 3/2000 | G01N 29/24 |
| SU | WO 87/04793 | 8/1987 | G01N 29/00 |
| WO | WO 8809895 | 12/1988 | F16K 37/00 |
| WO | WO 2007/149605 | 12/2007 | |
| WO | WO 2014/167471 | 10/2014 | G01F 23/30 |
| WO | WO 2020/136945 | 7/2020 | G01F 23/296 |

OTHER PUBLICATIONS

Amjad, Umar et al. "Change in time-to-fight of longitudinal (axisymmetric) wave modes due to lamination in steel pipes" Proceedings of SPIE vol. 8695, Health Monitoring of Structural and Biological Systems 2013, 869515 (Apr. 17, 2013); 10 pgs.

Amjad, Umar et al., "Effects of transducers on guided wave based structural health monitoring" Proceedings of SPIE, vol. 10600, Health Monitoring of Structural and Biological Systems XII, 106000F (Apr. 23, 2018),10 pgs.

Amjad, U. et al., "Generalized representations and universal aspects of Lamb wave dispersion relations" Proceedings of SPIE, vol. 7650, Health Monitoring of Structural and Biological Systems 2010, 76502F (Apr. 8, 2010), 9 pgs.

Amjad, Umar et al., "Detection and quantification of pipe damage from change in time of flight and phase" Ultrasoncis vol. 62 (2015) pp. 223-236, Jun. 11, 2015, 14 pgs.

Amjad, Umar et al., "Detection and quantification of diameter reduction due to corrosion in reinforcing steel bars" Structural Health Monitoring 2015, vol. 14(5) 532-543, 12 pgs.

Amjad, Umar et al., "Detection and quantification of delamination in laminated plates from the phase of appropriate guided wave modes" Optical Engineering 55(1), Jan. 2016, 11 pgs.

API: American Petroleum Institute Preliminary Program, Oct. 16-17, 2019, 5 pages.

Gurkov, Andrey "Gigantic Druzhba oil pipeline paralyzed for weeks" May 7, 2019, 3 pages, http://www.dw.com/en/gigantic-druzhba-oil-pipeline-paralyzed-for-weeks/a-48638989.

Hassanzadeh et al., "Investigation of factors affecting on viscosity reduction of sludge from Iranian crude oil storage tanks", Petroleum Science, vol. 15, Jul. 2018, pp. 634-643.

Kak et al., "Principles of Computerized Tomographic Imaging", IEEE, 1988, Chapter 2, 48 pgs.

Luck, Marissa "Deer Park fire a 'blemish' for the petrochemical industry's image" Houston Chronicle, Mar. 26, 2019, 3 pages https://www.houstonchronicle.com/business/energy/article/Deer-Park-fire-a-blemish-for-the-image-of-13717661.php.

Pandey, "Ultrasonic attenuation in condensed matter", Dissertation for V.B.S. Purvanchal University, 2009, Chapter 1, 36 pgs.

Pluta et al., "Stress Dependent Dispersion Relations of Acoustic Waves Travelling on a Chain of Point Masses Connected by Anharmonic Linear and Torsional Springs" International Congress on Ultrasonics AIP Conf. Proc. 1433, 471-474 (2012); 5 pgs.

Shelke, et al., "Mode-Selective Excitation and Detection of Ultrasonic Guided Waves for Delamination Detection in Laminated Aluminum Plates" IEEE Transactions on Ultrasonics, Ferroelectrics, and Frequency Control, vol. 58, No. 3, Mar. 2011, 11 pgs.

"TOPS Terminal Operating Practices Symposium" Program Agenda, Apr. 11, 2018, 1 page.

Zadler, et al., "Resonant Ultrasound Spectroscopy: theory and application", Geophysical Journal International, vol. 156, Issue 1, Jan. 2004, pp. 154-169.

Examination Report No. 1 issued in Australian Application No. 2020283140 dated Jan. 4, 2022, 6 pgs.

Examination Report No. 1 issued in Australian Patent Application No. 2020302919, dated Feb. 15, 2022, 4 pgs.

International Search Report and Written Opinion issued in PCT/US20/35404, dated Aug. 24, 2020, 11 pages.

International Search Report and Written Opinion issued in PCT/US20/39966, dated Sep. 18, 2020, 13 pages.

International Preliminary Report on Patentability issued in PCT/US20/35404 dated Nov. 16, 2021, 8 pgs.

International Preliminary Report on Patentability issued in PCT/US20/39966 dated Dec. 28, 2021, 10 pgs.

Notice of Allowance issued in U.S. Appl. No. 16/888,469, dated Dec. 23, 2020, 16 pgs.

Notice of Allowance issued in U.S. Appl. No. 17/148,122 dated Jun. 16, 2021, 8 pgs.

Notice of Allowance issued in U.S. Appl. No. 16/914,092 dated Oct. 28, 2021, 14 pgs.

Office Action issued in Canadian Patent Application No. 3,140,008, dated Feb. 14, 2022, 4 pgs.

Office Action issued in U.S. Appl. No. 16/888,469, dated Aug. 5, 2020, 8 pages.

Office Action issued in U.S. Appl. No. 16/888,469, dated Sep. 8, 2020, 20 pages.

Office Action issued in U.S. Appl. No. 16/914,092, dated Nov. 10, 2020, 22 pgs.

Office Action issued in U.S. Appl. No. 16/914,092, dated Mar. 1, 2021, 25 pgs.

Office Action issued in U.S. Appl. No. 16/914,092, dated Jun. 24, 2021, 24 pgs.

Office Action issued in U.S. Appl. No. 17/148,122, dated Mar. 2, 2021, 26 pgs.

U.S. Appl. No. 17/540,021, filed Dec. 1, 2021, Heim et al.
U.S. Appl. No. 17/541,036, filed Dec. 2, 2021, Heim et al.
U.S. Appl. No. 17/543,152, filed Dec. 6, 2021, Bivolarsky et al.
U.S. Appl. No. 17/542,814, filed Dec. 6, 2021, Bivolarsky et al.
U.S. Appl. No. 17/542,465, filed Dec. 5, 2021, Bivolarsky et al.
U.S. Appl. No. 17/542,872, filed Dec. 6, 2021, Bivolarsky et al.
U.S. Appl. No. 17/543,200, filed Dec. 6, 2021, Bivolarsky et al.
U.S. Appl. No. 17/542,462, filed Dec. 5, 2021, Bivolarsky et al.
U.S. Appl. No. 17/566,020, filed Dec. 30, 2021, Bivolarsky et al.

International Search Report and Written Opinion issued in PCT/US21/61962 dated Feb. 16, 2022, 9 pgs.

International Search Report and Written Opinion issued in PCT/US21/61924 dated Feb. 16, 2022, 9 pgs.

International Search Report and Written Opinion issued in PCT/US21/62010 dated Feb. 16, 2022, 9 pgs.

International Search Report and Written Opinion issued in PCT/US21/61970 dated Feb. 18, 2022, 17 pgs.

International Search Report and Written Opinion issued in PCT/US21/61925 dated Feb. 18, 2022, 9 pgs.

International Search Report and Written Opinion issued in PCT/US21/61646 dated Feb. 25, 2022, 9 pgs.

International Search Report and Written Opinion issued in PCT/US21/65664 dated Mar. 11, 2022, 9 pgs.

International Search Report and Written Opinion issued in PCT/US21/62001 dated Mar. 9, 2022, 9 pgs.

International Search Report and Written Opinion issued in PCT/US21/61926 dated Mar. 8, 2022, 9 pgs.

Notice of Acceptance issued in Australian Application No. 2020302919 dated Mar. 2, 2022, 4 pgs.

(56) References Cited

OTHER PUBLICATIONS

Notice of Acceptance issued in Australian Application No. 2020283140 dated Mar. 30, 2022, 4 pgs.
Notice of Allowance issued in Canadian Application No. 3,140,008 dated May 5, 2022, 1 pg.
Office Action issued in Australian Patent Application No. 2020283140, dated Mar. 18, 2022, 5 pgs.
Office Action issued in U.S. Appl. No. 17/543,200, dated Mar. 9, 2022, 8 pages.
Office Action issued in U.S. Appl. No. 17/542,465, dated Mar. 11, 2022, 22 pages.
Office Action issued in U.S. Appl. No. 17/542,872, dated Mar. 17, 2022, 21 pages.
Office Action issued in U.S. Appl. No. 17/566,020, dated Mar. 18, 2022, 20 pages.
Office Action issued in U.S. Appl. No. 17/541,036, dated Mar. 31, 2022, 22 pages.
Office Action issued in U.S. Appl. No. 17/543,152, dated Apr. 19, 2022, 17 pages.
Office Action issued in U.S. Appl. No. 17/542,814, dated Apr. 25, 2022, 21 pages.
Vermeersch, "Influence of substrate thickness on thermal impedance of microelectronic structures", Microelectronics Reliability, 47, 2007, pp. 437-443.
Office Action issued in U.S. Appl. No. 17/542,462, dated May 27, 2022, 28 pages.
Office Action issued in U.S. Appl. No. 17/566,020, dated Jul. 12, 2022, 20 pages.
Office Action issued in U.S. Appl. No. 17/543,200, dated Jul. 20, 2022, 25 pages.
Office Action issued in U.S. Appl. No. 17/746,622, dated Jul. 22, 2022, 19 pages.
Office Action issued in U.S. Appl. No. 17/541,036, dated Aug. 9, 2022, 22 pages.
Office Action issued in U.S. Appl. No. 17/746,640, dated Aug. 18, 2022, 19 pages.
Notice of Allowance issued in U.S. Appl. No. 17/542,465, dated Jul. 11, 2022, 18 pages.
Notice of Allowance issued in U.S. Appl. No. 17/542,872, dated Jul. 11, 2022, 13 pages.
Notice of Allowance issued in U.S. Appl. No. 17/543,152, dated Jul. 29, 2022, 16 pages.
Office Action issued in U.S. Appl. No. 17/542,814, dated Aug. 26, 2022, 22 pages.
Office Action issued in U.S. Appl. No. 17/540,021, dated Sep. 15, 2022, 40 pages.
Office Action issued in U.S. Appl. No. 17/542,462, dated Nov. 14, 2022, 11 pgs.
Office Action issued in U.S. Appl. No. 17/566,020, dated Nov. 14, 2022, 21 pgs.
Notice of Allowance issued in U.S. Appl. No. 17/543,200, dated Nov. 3, 2022, 16 pages.
Notice of Allowance issued in U.S. Appl. No. 17/746,622, dated Nov. 8, 2022, 16 pages.

\* cited by examiner

SYSTEMS AND METHODS FOR DETERMINING FLOATING ROOF LEVEL TILT AND CHARACTERIZING RUNOFF

CROSS REFERENCE TO RELATED APPLICATION

This application claims benefit of U.S. Provisional Application Ser. No. 63/121,558 entitled, "Systems and Methods for Measuring Floating Roof Level Tilt and Characterizing Runoff" filed Dec. 4, 2020, the entire disclosure of which is incorporated herein by reference.

FIELD OF THE DISCLOSURE

The present disclosure is generally related to floating roof storage tanks and more particularly is related to systems and methods for measuring floating roof level tilt and characterizing runoff from floating roof storage tanks.

BACKGROUND OF THE DISCLOSURE

Above ground storage tanks can be used to store liquids, solids, or gases. Outdoor above ground storage tanks typically either have a fixed roof and/or a floating roof that lays on the surface of the stored material and rises and falls as the amount of stored material increases or decreases. Floating roof storage tanks usually take the form of an open-topped cylindrical tank shell (made of an impermeable material, such as steel) outfitted with an internal roof sized to fit snugly within the cylindrical shell and to float on the surface of the liquid or other material stored therein. A unique advantage of floating roof storage tanks is that there is no vapor space in a floating roof tank, as opposed to a fixed roof tank, which accommodates vapor above a stored liquid. Floating roof tanks thus can greatly reduce or eliminate evaporative loss of any stored liquid. Floating roof storage tanks can be particularly useful for storing large quantities of petroleum products, such as crude oil or condensate.

However, a storage tank with a floating roof can experience tilting of the floating roof, either due to mechanical failure or excess liquid pooling on top of the floating roof. Under normal conditions, fluids (such as rainwater) deposited on top of a floating roof will be drained off. However, if any environmentally restricted material is present in the runoff, the contaminated fluid cannot be drained to the open ground. Thus, a heretofore unaddressed need exists in the industry to address the aforementioned deficiencies and inadequacies of current above ground storage tanks, including vulnerability to undetected floating roof tilt and inability to determine if runoff is contaminated.

SUMMARY OF THE DISCLOSURE

Embodiments of the present disclosure provide floating roof storage tank systems and related methods. Briefly described, in architecture, the presently disclosed floating roof storage tank system can include a storage tank, a floating roof, and a plurality of acoustic sensors. The storage tank has one or more walls defining an interior space and the floating roof is configured to move vertically within the interior space. The acoustic sensors are levelly mounted along a horizontal plane on the one or more walls of the storage tank. One or more signals received by at least a portion of the plurality of acoustic sensors are used to determine a tilt angle of the floating roof.

The present disclosure can also be viewed as providing a system for determining a tilt angle of a floating roof of a storage tank. Briefly described, in architecture, one embodiment of the system, among others, can be implemented as follows. A storage tank has one or more walls defining an interior space. A quantity of liquid is within the interior space of the storage tank. A floating roof is positioned on a top surface of the quantity of liquid, wherein the floating roof is movable vertically within the interior space of the storage tank. At least three acoustic sensors are mounted to an exterior surface of the one or more walls of the storage tank, wherein the at least three acoustic sensors are substantially levelly mounted along a horizontal plane. One or more signals are received by the three acoustic sensors, wherein the one or more signals indicating a presence of the floating roof at the horizontal plane of each of the three acoustic sensors. A computerized device has a computer processor, wherein the computerized device is in communication with the at least three acoustic sensors, wherein the computer processor determines a tilt angle of the floating roof using at least the one or more received signals.

The present disclosure can also be viewed as providing methods of determining a tilt angle of a floating roof of a storage tank system. In this regard, one embodiment of such a method, among others, can be broadly summarized by the following steps: providing a storage tank having one or more walls defining an interior space, and a floating roof configured to move vertically within the interior space of the storage tank; mounting a plurality of acoustic sensors to the one or more walls of the storage tank, wherein the plurality of acoustic sensors is levelly mounted along a horizontal plane; receiving one or more signals by at least a portion of the plurality of acoustic sensors; and determining a tilt angle of the floating roof based on the received one or more signals.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

To improve upon conventional floating roof storage tanks, the subject disclosure is directed to a floating roof storage tank outfitted with at least three internally mounted acoustic sensors, which allow for tilt in the floating roof to be measured and potentially contaminated runoff to be detected. In contrast to traditional storage tanks that cannot easily detect tilt of an internal floating roof, the presently disclosed systems can measure any tilt of a floating roof and can also, importantly, determine if any runoff from the storage tank is contaminated. In this way, the disclosed floating roof storage tank systems can provide for increased environmental compliance and quickly bring attention to mechanical failures that may have resulted in tilting of the storage tank's floating roof. The disclosed systems may be used to store and monitor any desired type of material. For example, in some embodiments, the disclosed systems may be used to monitor stored liquids, such as petroleum products.

Figure 1:
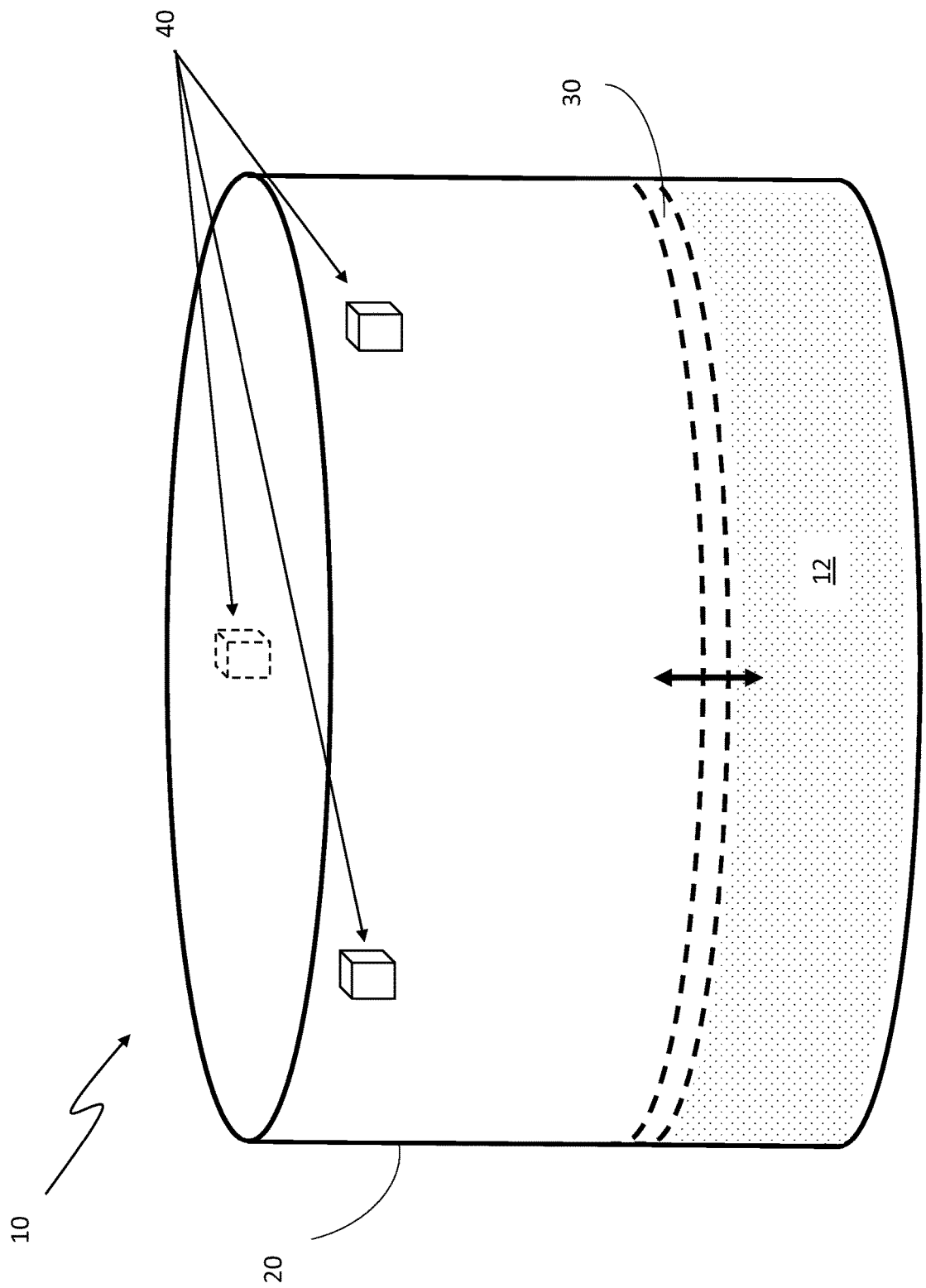
FIG. 1 is a transparent perspective illustration of a floating roof storage tank system outfitted with a level floating roof and three acoustic sensors, in accordance with a first exemplary embodiment of the present disclosure.

FIG. 1 is a transparent perspective illustration of an exemplary floating roof storage tank system 10 configured in accordance with a first exemplary embodiment of the present disclosure. For simplicity and ease of description, the floating roof storage tank system 10 described and illustrated herein may simply be referred to as "system 10." As shown in FIG. 1, the system 10 includes a storage tank 20 with a floating roof 30. The storage tank 20 may include any type of storage vessel, but in particular, it may be a storage vessel used to hold large volumes of fluids 12, such as petroleum products, chemicals, or similar materials. The floating roof 30 may be supported substantially only by fluid material stored within the storage tank 20 and thus moves vertically up and down along the height of the storage tank 20 as material is added or removed from the storage tank 20. In some situations, cabling, guides, or other mechanical components may also be used to partially support the floating roof 30 or guide it as it moves up and down with the changing fluid level in the storage tank 20. If desired, the storage tank 20 may also have a fixed external roof (not illustrated in FIG. 1) that remains in a fixed position relative to the storage tank 20 regardless of the level of material present within the storage tank 20.

The storage tank 20 has one or more walls defining an interior space. Although the storage tank 20 illustrated in FIG. 1 has one wall defining a cylindrical interior space, other configurations are also possible and contemplated herein. For example, the interior space of the storage tank 20 may have a cross-section that is oval, rectangular, square, or otherwise shaped, if desired. The floating roof 30 is shaped to fit within the cross-section or footprint of the storage tank's interior. Thus, if the storage tank 20 has an interior space with a circular cross-section, the floating roof 30 may have a circular shape of approximately equal size.

The storage tank 20 has a surface on which a plurality of acoustic sensors 40 are positioned. Preferably, the acoustic sensors 40 are positioned on an external surface of the storage tank 20, such that they do not need to contact the liquid 12 within the storage tank 20. In other examples, it may be possible to mount the acoustic sensors 40 within the storage tank 20 or have a portion of the acoustic sensors 40 on the exterior of the storage tank 20 while others are positioned within the tank's interior.

In some embodiments, the system 10 includes at least three, four, five, six or more acoustic sensors 40. As shown in FIG. 1, system 10 may include exactly three acoustic sensors 40 equidistantly positioned around the circumference of the storage tank 20, however, other embodiments are also possible where more or less acoustic sensors 40 are positioned at other locations around a storage tank 20 having another shape. The acoustic sensors 40 may be mounted at the same vertical height around the storage tank 20. In particular, the acoustic sensors 40 are levelly mounted along a horizontal plane within the storage tank 20, such that when the storage tank 20 is filled with a liquid 12 to the height of one acoustic sensor 40, the liquid 12 will contact all acoustic sensors 40 equally. Various types of acoustic sensors will be known to those skilled in the relevant art and it is to be understood that any suitable type of acoustic sensor 40 may be used in system 10.

Figure 2:
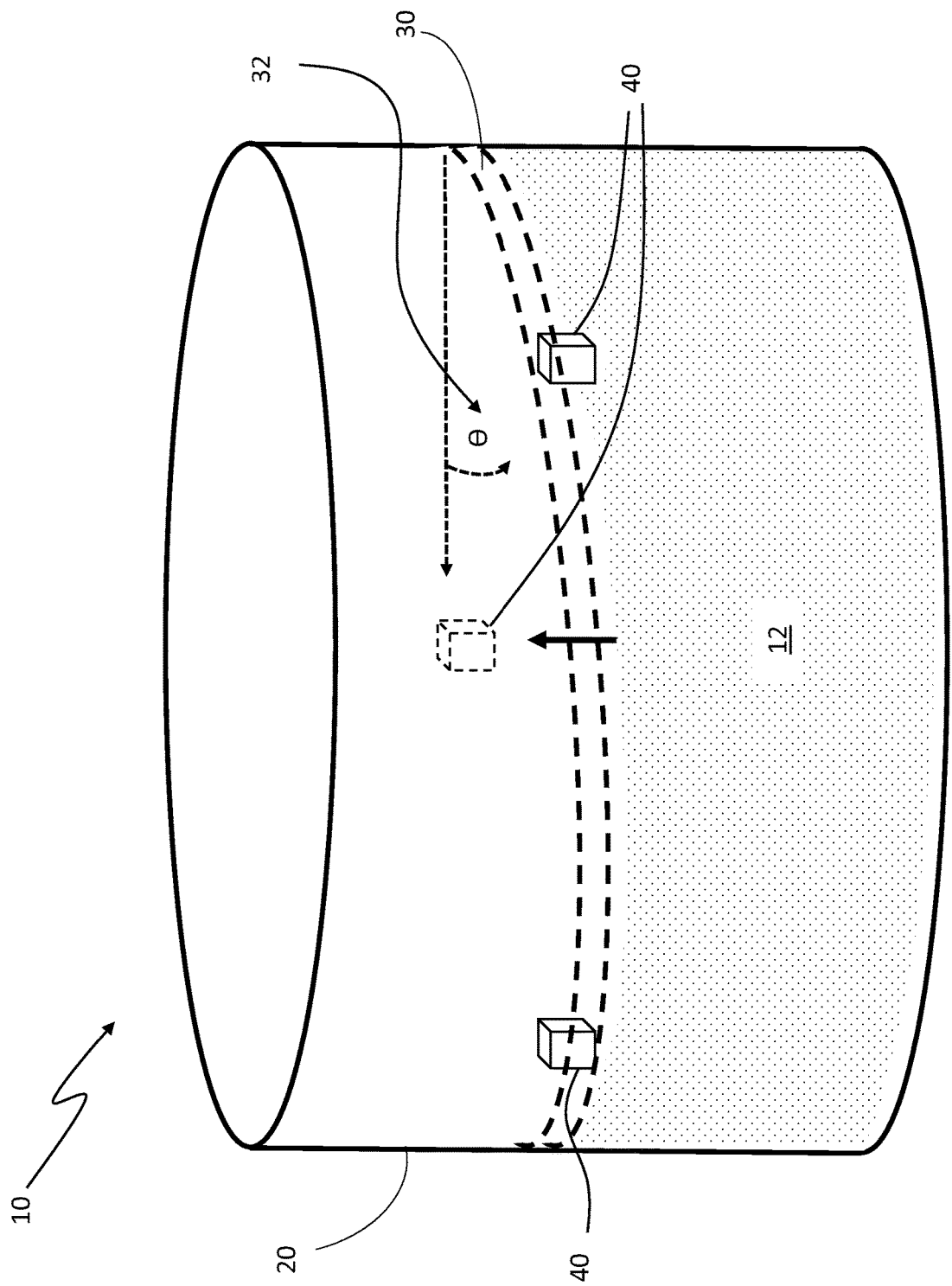
FIG. 2 is a transparent perspective illustration of the floating roof storage tank system shown in FIG. 1 in which the floating roof is tilted, in accordance with the first exemplary embodiment of the present disclosure.

In use, the system 10 may be capable of detecting a tilt or angular position relative to a horizon of the floating roof 30. FIG. 2 is a transparent perspective illustration of the floating roof storage tank system shown in FIG. 1 in which the floating roof is tilted, in accordance with the first exemplary embodiment of the present disclosure. With reference to FIGS. 1-2, throughout use of the storage tank 20, the floating roof 30 may move between level or a horizontal position as shown in FIG. 1 to positions where the floating roof 30 is tilted relative to the horizon, as shown in FIG. 2. The presently disclosed system 10 may advantageously be capable of measuring the tilt angle 32, identified as $\theta$ within FIG. 2, if present, of the floating roof 30 at any point in time during use of the storage tank 20. The tilt angle 32 may be understood as the angle between the substantially planar floating roof 30 and the horizon.

For the system 10, determining a tilt angle 32 of the floating roof 30 may be determined through measurements and calculations. For example, the acoustic sensors 40 positioned around the exterior of the storage tank 20 can determine when the floating roof 30, or specifically the seal of the floating roof 30 which contacts the interior surface of the sidewall of the storage tank 20, passes each acoustic sensor 40 as liquid 12 rises or falls within the storage tank 20. The acoustic sensors 40 can record the time when the floating roof 30, or the seal of the floating roof 30, reaches each acoustic sensor 40, and in particular, the time difference between when the floating roof 30 is sensed at one acoustic sensor 40 relative to another acoustic sensor 40. The rate of change of the liquid 12 height within the storage tank 20 can then be used to calculate the distance the floating roof 30 travelled between each measurement. These distances can be used to define a mathematical plane and the orientation and tilt of the plane from a horizontal plane defines the pitch angle of the floating roof 30 as well as which direction within the storage tank 20 the floating roof 30 is tilted.

It is noted that the number of acoustic sensor 40 can vary based on the design of the system 10. For instance, two, three, or more acoustic sensors 40 can be used. When a large number of acoustic sensors 40 are used, such as over five or 10 sensors, a more accurate measurement of the floating roof 30 may be achievable. For instance, with this number of sensors 40 it may be possible to measure liquid, metal, or air layers within the storage tank 20. In a preferred design, the system 10 will have three acoustic sensors 40 such that it can use three points in three-dimensional space to determine the position of the plane of the floating roof 30. Changing the angle of the acoustic sensors 40 or a frequency of their emitted signals can also be used to determine the plane of the floating roof 30. Additionally, other factors may be used with the measurements and calculations, such as determining or identifying the temperature of the storage tank 20 or the material or materials therein. This can be achieved with a temperature sensor connected to, or in communication with the storage tank 20 or floating roof 30, or the temperature may be determined with other technologies.

As an example of the operation of the system 10, assume a storage tank 20 has a diameter of 20 feet and is filling up with liquid 12 at a rate of 1 ft/hour. A system 10 containing three acoustic sensors 40 positioned at the same vertical height along the storage tank 20 and spaced equidistantly around a storage tank 20 with a circular cross-section at 0°, 120° and 240°, each detect the floating roof seal at 9 am, 10 am and 12 am, respectively. In this example embodiment, the data obtained from the acoustic sensors 40 show that the floating roof 30 is tilted up 1 foot at the 120° sensor and 2 feet at the 240° sensor. After calculating the normal vector to the plane, the tilt angle 32 of the floating roof 30 is calculated to be approximately 6.6° off of horizontal.

Upon consideration of the subject application, one of skill in the art will readily be able to calculate a tilt angle 32 for any given floating roof 30 with basic knowledge about the storage tank 20, such as its shape and dimensions, along with data from acoustic sensors 40 using the techniques described herein as well as other relevant teachings known in the art. Moreover, these measurements and calculations can be used by the system 10 to identify possible reasons for the tilt angle 32, such as friction between the floating roof 30 and the storage tank 20, an obstruction within the storage tank 20, or possible materials on top of the floating roof 30 which are concentrated along a portion of the floating roof 30, thereby causing it to tilt.

Many storage tanks 20 having a floating roof 30 do not have any structure or covering positioned above the floating roof 30, such that rain, snow, and other precipitation may accumulate on the top surface of the floating roof 30. In these tanks, a drainage system may be used to remove this unwanted material on the top of the floating roof 30.

Figure 3:
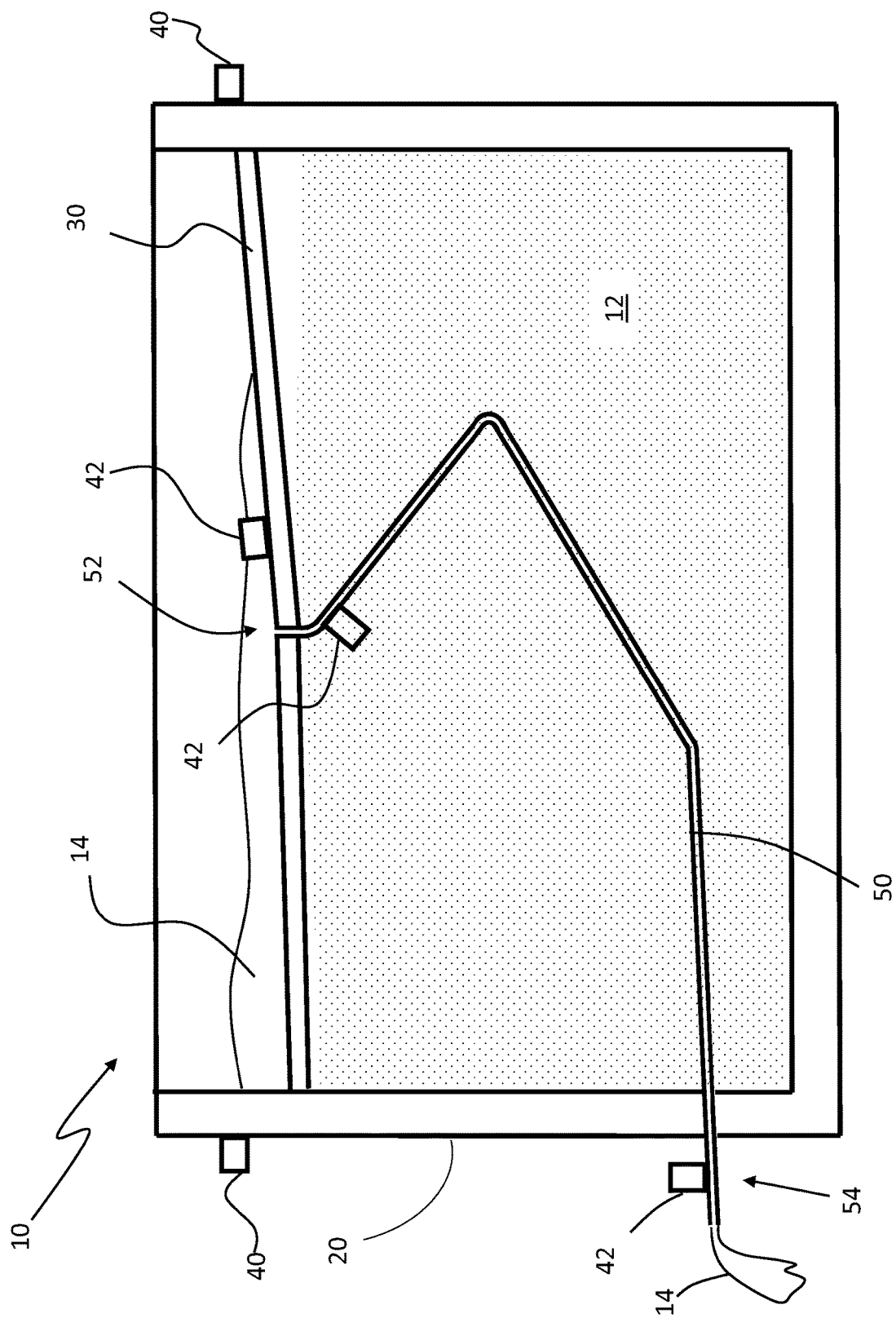
FIG. 3 is a cross-sectional illustration of the floating roof storage tank system shown in FIG. 1 in which the floating roof is tilted, in accordance with the first exemplary embodiment of the present disclosure.

FIG. 3 is a cross-sectional illustration of the floating roof storage tank system shown in FIG. 1 in which the floating roof is tilted and precipitation has accumulated thereon, in accordance with the first exemplary embodiment of the present disclosure. As shown in FIG. 3, the storage tank 20 having the liquid 12 therein has a floating roof 30 with a quantity of accumulated precipitation 14 which is positioned on the top of the floating roof 30. A drainage system 50 is provided with the storage tank 20, which generally includes pipework which extends from an inlet 52 within the floating roof 30 to an outlet 54 positioned proximate to a bottom area of the storage tank 20. The accumulated precipitation 14 on the floating roof 30 may flow through the inlet 52, through the pipework, and exit the outlet 54, thereby draining the precipitation from the floating roof 30.

Because storage tanks can often be used to store hazardous materials, or materials which should not be introduced into the surrounding natural environment, it is important to ensure that any accumulated precipitation on the floating roof 30 is not contaminated with the liquid 12 within the storage tank 20, and vice versa. For instance, if the roof seal on the floating roof 30 leaks, liquid within the storage tank 20, such as gas or another petroleum product, may mix with the rainfall on top of the floating roof 30, such that when this precipitation 14 is drained through the drainage system 50, the surrounding natural environment becomes contaminated. Similarly, a leaky roof seal may also introduce the precipitation 14 on the floating roof 30 into the liquid 12 within the storage tank 20, thereby contaminating or degrading the purity of the liquid 12.

The system 10 may be capable of determining if a contamination situation exists using the acoustic sensors 40 positioned around the storage tank 20, or by using additional acoustic sensors 42 in select positions on, in, or near the storage tank 20. For example, one or more additional acoustic sensors 42 may also be included in system 10 and positioned where runoff of the accumulated perception may occur, such as, for example, along the inlet 52 or outlet 54 of the drainage system 50, or other locations along the storage tank 20. In some embodiments, the additional sensors may be mounted externally on the storage tank 20 or internally within the storage tank 20. These additional sensors can perform several measurements, such as, for example, determining if there is material, air or floating roof seal inside the storage tank 20 at the point where the acoustic sensors 40, 42 are mounted, identifying the material in the storage tank 20 or the drainage system 50, and/or combining acoustic sensor 40, 42 readings to determine the tilt angle 32 (FIG. 32) of the floating roof 30. It may also be possible to measure evaporations within the storage tank 20 based on measurements of the floating roof 30.

In some embodiments, the additional sensors 42 may also identify any material 14 present above the floating roof 30, such as when an additional sensor 42 is mounted to the top surface of the floating roof 30, or proximate to the inlet 52 of the drainage system 50. For example, the acoustic sensors 40 or an additional acoustic sensor 42 may be positioned on or within the storage tank 20 and can identify any material above the storage tank 20 as the floating roof 30 or its seal passes each acoustic sensor 40, 42. In these and other embodiments, an additional acoustic sensor can be positioned on or near a roof drain configured to divert water from the storage tank's roof. As drainage passes the additional acoustic sensor 42, the additional acoustic sensor 42 can determine whether the drainage is contaminated. In this way, the disclosed system 10 can advantageously be used to easily determine if any runoff from the storage tank 20 is contaminated. In turn, the system 10 can be implemented to control the release of that contaminated runoff, such as by controlling valves to divert the runoff to container.

The acoustic sensors 40 and additional sensors 42, if present, in system 10 are in communication with one another and may be in communication with a separated computing device that may be used to calculate the tilt angle 32 of the floating roof 30 or make determinations or calculations on other aspects of the storage tank 20, the floating roof 30, or operation of the system 10.

Figure 4:
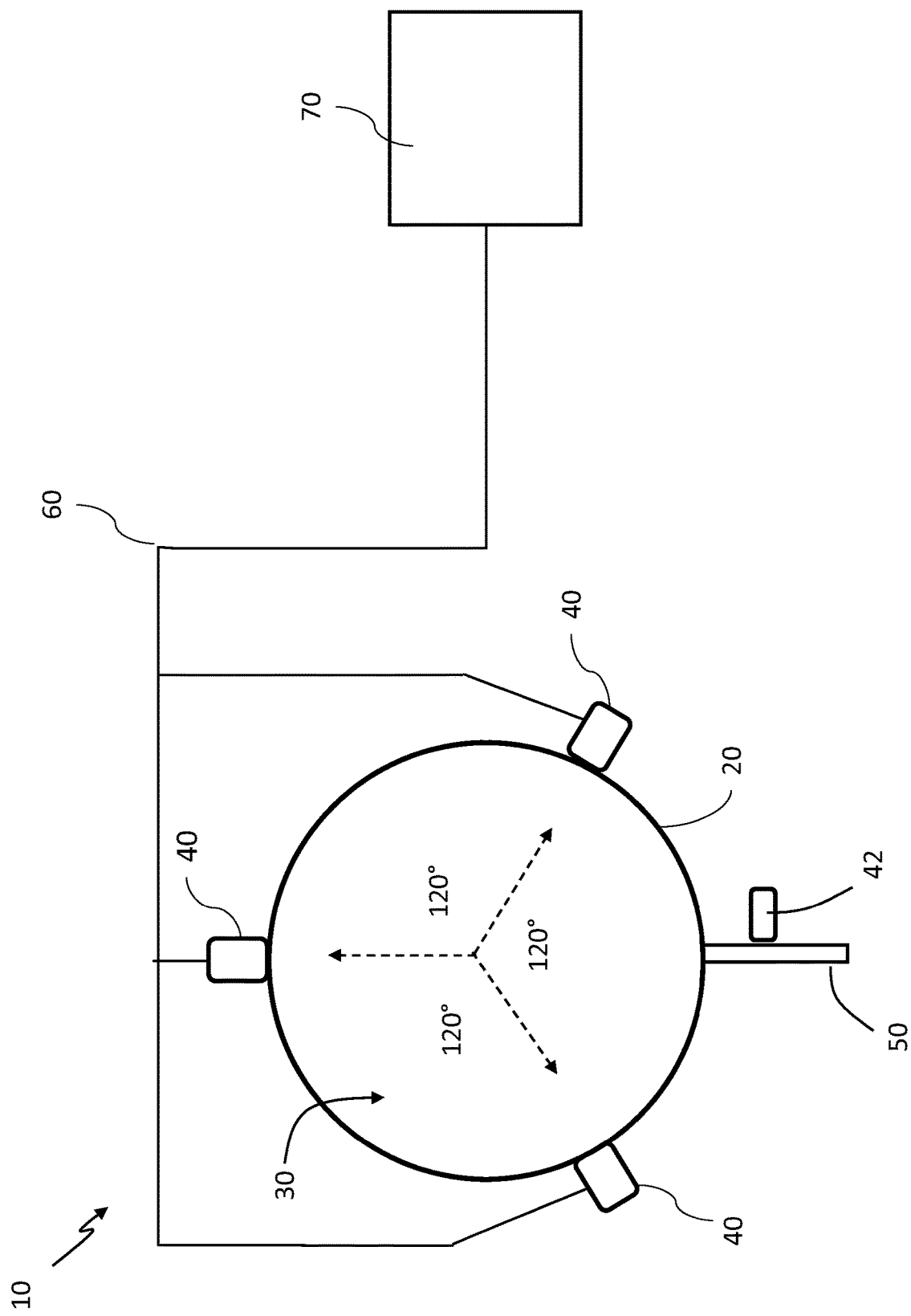
FIG. 4 is a top view diagrammatical illustration of the floating roof storage tank system shown in FIG. 1, in accordance with the first exemplary embodiment of the present disclosure.

FIG. 4 is a top view diagrammatical illustration of the floating roof storage tank system shown in FIG. 1, in accordance with the first exemplary embodiment of the present disclosure. As shown in FIG. 4, the system 10 includes the acoustic sensors 40 being positioned substantially equidistantly around the storage tank 20, e.g., with approximately 120° between each sensor 40. The acoustic sensors 40 are also in communication with a computerized device 70 having a computer processor. The acoustic sensors 40 and the additional sensors 42, such as the acoustic sensor 42 positioned on the drainage system 50, may be in electrical communication over at least one network 60 with the computer processor 70 of the computerized device. The at least one network 60 may include any suitable network systems, including wired data connections and wireless data connections, e.g., LAN, intranet, Internet, Wi-Fi®, Bluetooth®, NFC, radio, or any other type of network connection. The computer processor 70 may include any type and number of processors, including stationary processors, mobile processors, mobile devices, processor arrays, cloud processing networks, and the like. The computer processor 70 may include any components required for operation, including a power source, computer-readable memory, network communications, and the like.

Data from the acoustic sensors 40, 42 may be communicated to the computer processor 70 along the at least one network 60. Communicated data may include data from the plurality of acoustic sensors 40 or any additional acoustic sensors 42, such as characteristic information about any acoustic signals transmitted, and received data from any reflected acoustic signals which indicate characteristics of the system, such as, for example, the tilt of the floating roof 30, the identity of the fluid material. The communicated data may be analyzed to determine composition and other material characteristics of the material within the storage tank 20 or the precipitate material above the floating roof 30. Any of the data may be processed, communicated to other networks or devices, displayed for viewing and analysis, or used to control other parts of the infrastructure on which the system 10 is based. For instance, if desired, system 10 may include an alarm to advise when a tilt angle above a predetermined threshold has been detected, or when contamination of runoff or the liquid within the storage tank 20 has been detected. The system 10 may also control valves or similar mechanical structures which control the flow of liquid from within the storage tank 20 or external to the storage tank 20.

Figure 5:
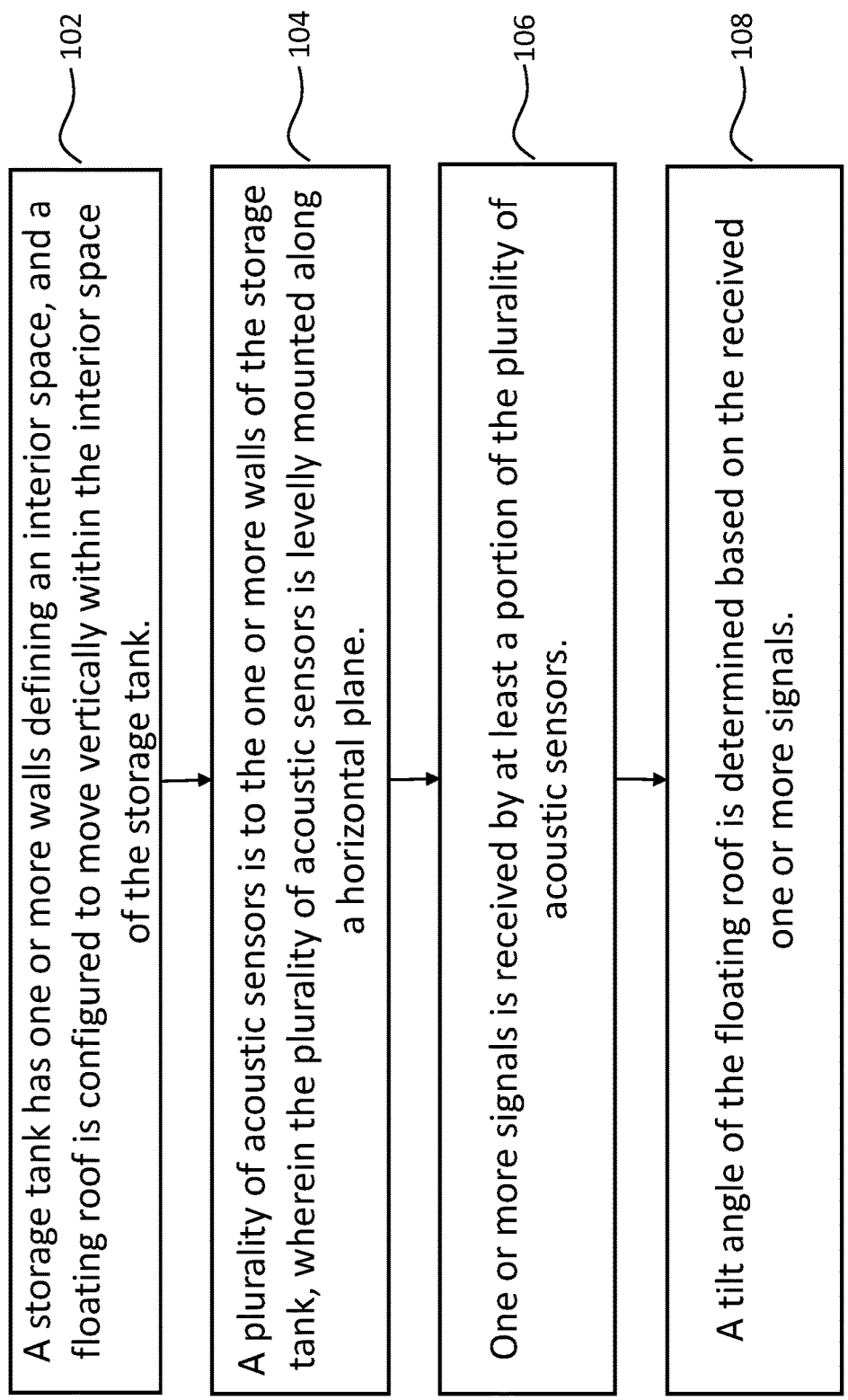
FIG. 5 is a flowchart illustrating a method of determining a tilt angle of a floating roof of a storage tank system, in accordance with the first exemplary embodiment of the present disclosure.

FIG. 5 is a flowchart 100 illustrating a method of determining a tilt angle of a floating roof of a storage tank system, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a storage tank has one or more walls defining an interior space, and a floating roof is configured to move vertically within the interior space of the storage tank. A plurality of acoustic sensors is to the one or more walls of the storage tank, wherein the plurality of acoustic sensors is levelly mounted along a horizontal plane (block 104). One or more signals is received by at least a portion of the plurality of acoustic sensors (block 106). A tilt angle of the floating roof is determined based on the received one or more signals (block 108). Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A floating roof storage tank system comprising:
   a storage tank having one or more sidewalls defining an interior space;
   a floating roof configured to move vertically within the interior space of the storage tank;
   a plurality of acoustic sensors mounted on an exterior surface of the one or more sidewalls of the storage tank, wherein the plurality of acoustic sensors is levelly mounted along a horizontal plane; and
   a computerized device having a computer processor, the computerized device in communication with the at least a portion of the plurality of acoustic sensors, wherein a tilt angle of the floating roof is determined by the computer processor based on, at least in part, two or more signals received by at least the portion of the plurality of acoustic sensors.

2. The system of claim 1, wherein each acoustic sensor of the plurality of acoustic sensors are positioned substantially equidistantly about a perimeter of the storage tank.

3. The system of claim 2, wherein each acoustic sensor of the plurality of acoustic sensors are positioned substantially 120° from one another.

4. The system of claim 1, wherein one or more of the plurality of acoustic sensors determines a material identity of a quantity of liquid within the storage tank.

5. The system of claim 1, further comprising an additional acoustic sensor, wherein the additional acoustic sensor determines a material identity of a quantity of liquid positioned on top of the floating roof or within a runoff drainage system connected to the floating roof.

6. The system of claim 5, wherein the additional acoustic sensor is positioned at an inlet or an outlet of the runoff drainage system.

7. The system of claim 1, wherein the tilt angle of the floating roof is determined by the computer processor by taking sensor measurements at increments of time to detect the presence of the floating roof at the horizontal plane at which the plurality of acoustic sensors is levelly mounted.

8. A system for determining a tilt angle of a floating roof of a storage tank, the system comprising:
   a storage tank having one or more sidewalls defining an interior space;
   a quantity of liquid within the interior space of the storage tank;
   a floating roof positioned on a top surface of the quantity of liquid, wherein the floating roof is movable vertically within the interior space of the storage tank;
   at least three acoustic sensors mounted to an exterior surface of the one or more sidewalls of the storage tank, wherein the at least three acoustic sensors are substantially levelly mounted along a horizontal plane;
   two or more signals received by the three acoustic sensors, the two or more signals indicating a presence of the floating roof at the horizontal plane of each of the three acoustic sensors; and
   a computerized device having a computer processor, the computerized device in communication with the at least three acoustic sensors, wherein the computer processor determines a tilt angle of the floating roof using at least the two or more received signals.

9. The system of claim 8, wherein the two or more signals of the three or more acoustic sensors are used by the computer processor to determine the tilt angle of the floating roof by taking sensor measurements at increments of time.

10. A method of determining a tilt angle of a floating roof of a storage tank system, the method comprising:
   providing a storage tank having one or more sidewalls defining an interior space, and a floating roof configured to move vertically within the interior space of the storage tank;
   mounting a plurality of acoustic sensors to an exterior surface of the one or more sidewalls of the storage tank, wherein the plurality of acoustic sensors is levelly mounted along a horizontal plane;
   receiving two or more signals by at least a portion of the plurality of acoustic sensors; and
   determining a tilt angle of the floating roof based on the received two or more signals.

11. The method of claim 10, wherein each acoustic sensor of the plurality of acoustic sensors are positioned substantially equidistantly about a perimeter of the storage tank.

12. The method of claim 11, wherein each acoustic sensor of the plurality of acoustic sensors are positioned substantially 120° from one another.

13. The method of claim 10, further comprising determining, with one or more of the plurality of acoustic sensors, a material identity of a quantity of liquid within the storage tank.

14. The method of claim 10, further comprising determining a material identity of a quantity of liquid positioned on top of the floating roof or within a runoff drainage system connected to the floating roof with an additional acoustic sensor.

15. The method of claim 14, wherein the additional acoustic sensor is positioned at an inlet or an outlet of the runoff drainage system.

16. The method of claim 10, wherein determining the tilt angle of the floating roof based on the received two or more signals further comprises taking sensor measurements at increments of time to detect the presence of the floating roof at the horizontal plane at which the plurality of acoustic sensors is levelly mounted.

* * * * *